(12) United States Patent
Meusel et al.

(10) Patent No.: US 8,210,143 B2
(45) Date of Patent: Jul. 3, 2012

(54) ADJUSTABLE CAMSHAFT ARRANGEMENT

(75) Inventors: Jürgen Meusel, Dittmannsdorf (DE); Bernd Mann, Zschopau (DE); Anton Lupei, Boernichen (DE); Daniel Paul, Burkhardtsdorf (DE); Uwe Grossgebauer, Dresden (DE); Mario Lindner, Chemnitz (DE)

(73) Assignee: Thyssenkrupp Presta Teccenter AG (LI)

( * ) Notice: Subject to any disclaimer, the term of this patent is extended or adjusted under 35 U.S.C. 154(b) by 0 days.

(21) Appl. No.: 13/133,493

(22) PCT Filed: Nov. 13, 2009

(86) PCT No.: PCT/EP2009/008102
§ 371 (c)(1),
(2), (4) Date: Aug. 4, 2011

(87) PCT Pub. No.: WO2010/066328
PCT Pub. Date: Jun. 17, 2010

(65) Prior Publication Data
US 2011/0283961 A1 Nov. 24, 2011

(30) Foreign Application Priority Data
Dec. 12, 2008 (DE) .......................... 10 2008 062 041

(51) Int. Cl.
*F01L 1/34* (2006.01)
(52) U.S. Cl. .................................. 123/90.17; 123/90.6
(58) Field of Classification Search ............... 123/90.15, 123/90.17, 90.6; 29/888.1; 74/567
See application file for complete search history.

(56) References Cited

U.S. PATENT DOCUMENTS

| 4,332,222 | A | 6/1982 | Papez |
| 7,069,892 | B2 | 7/2006 | Lechner et al. |
| 7,431,002 | B2 | 10/2008 | Horrmann et al. |
| 7,597,078 | B2 * | 10/2009 | Kroos et al. ............... 123/90.6 |

FOREIGN PATENT DOCUMENTS

| DE | 2822147 | C3 | 2/1982 |
| DE | 4306621 | A1 | 9/1994 |
| DE | 19646934 | A1 | 5/1998 |
| DE | 19757504 | A1 | 7/1999 |
| DE | 102004056191 | A1 | 6/2006 |
| DE | 102005004976 | A1 | 8/2006 |
| DE | 102005062208 | A1 | 6/2007 |
| EP | 1362986 | A1 | 11/2003 |
| EP | 1696107 | A1 | 8/2006 |
| GB | 2424257 | A * | 9/2006 |

OTHER PUBLICATIONS

International Search Report for PCT/EP2009/008102, Completed by the European Patent Office on Feb. 8, 2010, 6 Pages.

* cited by examiner

*Primary Examiner* — Thomas Denion
*Assistant Examiner* — Daniel Bernstein
(74) *Attorney, Agent, or Firm* — Brooks Kushman P.C.

(57) ABSTRACT

A camshaft arrangement having two shafts disposed coaxially, one inside the other. A connecting element is inserted into a receptacle in the inner shaft, such that a part of the connecting element protrudes out of the receptacle, and that the protruding part is inserted at least partially in a recess, the recess is designed to be open at least toward an end face of the inner shaft cam, and that the protruding part has at least two opposite side surfaces contacting two corresponding inner surfaces of the recess of each inner shaft cam with a force fit. The further connecting element is designed as a radial pin pressed through a hole in the inner shaft cam element into a receptacle of the inner shaft.

18 Claims, 7 Drawing Sheets

ADJUSTABLE CAMSHAFT ARRANGEMENT

CROSS-REFERENCE TO RELATED APPLICATION

This application is the U.S. national phase of PCT Appln. No. PCT/EP2009/008102 filed Nov. 13, 2009 which claims priority to German application DE 10 2008 062 041.6 filed Dec. 12, 2008, the disclosures of which are incorporated in their entirety by reference herein.

The invention relates to a camshaft arrangement for a drive, in particular for a motor vehicle engine. The camshaft arrangement comprises two shafts arranged coaxially one inside the other, a hollow outer shaft and an inner shaft being arranged so as to be rotatable relative to one another. Both shafts support in each case a plurality of cams, the outer shaft cams supported by the outer shaft being attached to the outer shaft for conjoint rotation therewith while the inner shaft cams supported by the inner shaft being attached to the inner shaft for conjoint rotation therewith. If the inner shaft and outer shaft are rotated relative to one another, the cams are adjusted relative to one another.

Adjustable camshaft arrangements of said type are increasingly being used in valve-controlled internal combustion engines in order to targetedly influence the control times of the valves of the engine with regard to power and torque delivery, fuel consumption and exhaust-gas emissions. Said camshaft arrangements are for example assembled camshaft systems having an outer shaft and, arranged coaxially therein, an inner shaft. The two shafts can be rotated relative to one another by means of an adjusting device. Arranged in an alternating fashion on the outer shaft are cam elements fixedly connected to the outer shaft and cam elements mounted so as to be rotatable about the outer shaft. Here, the rotatably mounted cam elements are fixedly attached to the inner shaft but are rotatable relative to the outer shaft by a defined circumferential angle. This is achieved for example by virtue of the inner shaft cam elements being connected to the inner shaft by means of a connecting element, said connecting element projecting with play through a recess in the outer shaft which permits the rotation of the inner shaft and therefore of the inner shaft cam by the defined circumferential angle.

The rotation of the inner shaft with respect to the outer shaft is effected for example by means of a phase adjuster which permits an adjustment of the outer shaft cams, which are fixedly connected to the outer shaft, relative to the inner shaft cams, which are fixedly connected to the inner shaft, or vice versa in order thereby to be able, for example, to obtain a phase shift of the valve control times or to vary the opening duration of the valves.

To produce a fixed connection between the inner shaft and the associated inner shaft cam elements, said cams and the inner shaft conventionally have bores into which corresponding connecting elements are inserted. These may be pins, bolts or screws. The cam elements may be designed correspondingly so as to permit the insertion of a connecting element.

For example, the German laid-open specification DE 197 57 504 A1 discloses in this regard a camshaft having a connecting element of said type in the form of a cylindrical pin. The cylindrical pin is inserted with an interference fit into a passage bore in the inner shaft and with an interference fit into the associated cam. The cam has for this purpose an outwardly projecting cylindrical region in which is situated a bore into which the cylindrical pin is inserted. The aim of the cylindrical region is to locate the bore away from the contact surface of the cam in order thereby to attain an uninterrupted contact surface of the cam with the outer shaft.

Furthermore, the German laid-open specification DE 10 2005 004 976 A1 discloses a camshaft having cams which are rotatable relative to one another, in which a connecting element is formed in two parts. A first part of the connecting element is hollow and projects into a radial bore in the inner shaft. A second connecting part is inserted from the other side into the hollow first connecting part such that the latter is expanded and an interference fit is produced. The two connecting parts may also be designed for example as a screw with a complementary threaded bore.

Also known, from the European patent EP 1 362 986 B1, is the assembly of an adjustable camshaft arrangement in which a hollow coupling pin is inserted with a tight fit into a bore both in the inner shaft and outer shaft and also into a cam. The outer diameter of the coupling pin is subsequently enlarged by the insertion of an inner pin in order to produce an interference fit.

Also, the German patent DE 28 22 147 C3 discloses a camshaft arrangement in which the connection between the inner shaft and cams is realized by means of a driver which is fastened by means of a screw to the inner shaft. The outer shaft has a recess for the passage of the driver. The driver also projects into an inner groove which is situated on the joining diameter of the associated cam. The cam is pushed with the groove from the side onto the driver and is secured in its axial position by rings on the right and on the left.

If the connection between the inner shaft cam and the inner shaft is designed as a fixed connection on account of the fluctuating camshaft loading, an interference fit of the connecting elements used is expediently used both in cams and also in the inner shaft. In particular in the case of the known connecting elements of constant cross section, this has the disadvantage that the cross section of the connecting element required for attaining the interference fit must be inserted via a plurality of component bores in the cam and in the inner shaft. This can result in undefined influencing of the interference-fit overlap and therefore the security of the interference-fit connection. In particular, joining connections of said type cannot have adequate connection rigidity. Also, the pressing of the components against one another in a blocked position can result in deformations and a loss of concentricity.

It is therefore an object of the invention to provide an assembled camshaft arrangement which is simple to assemble and which provides a secure connection of adequate strength between the inner shaft and inner shaft cam. In particular, by means of the invention—while ensuring assembly that is as simple as possible—the required cam rigidity and a high level of security against the inner shaft cam being pressed off should be ensured and, during assembly of the camshaft arrangement, deformation of the inner shaft should be prevented.

According to the invention, said object is achieved by means of a camshaft arrangement having the features of independent claim 1. Advantageous refinements of the camshaft arrangement emerge from subclaims 2-17.

According to the invention, the camshaft arrangement according to the preamble of claim 1 is characterized in that at least two connecting elements are provided for attaching each inner shaft cam to the inner shaft. Here, one connecting element is inserted into a receptacle in the inner shaft such that a part of the connecting element protrudes out of the receptacle, the protruding part being inserted at least partially into a cutout situated on the joining diameter of the respective inner shaft cam. Here, said cutout is formed so as to be open at least toward one end side of the inner shaft cam, and the protruding part has at least two opposite side surfaces which bear with an interference fit against two corresponding inner surfaces of the cutout of the respective inner shaft cam. Furthermore, the further connecting element is designed in the form of a so-called radial pin which is formed in particular without a head. Here, in the assembled state of the arrangement, the radial pin is guided in regions through a radial passage opening (in particular bore) of the inner shaft cam element and through a receptacle of the inner shaft and is held by means of an interference fit (with so-called (dimensional) overlap) in at least one of the two parts (advantageously in both parts).

In a particularly preferred embodiment of the invention, one or a first (cam-elevation-side) connecting element, designed in particular in the form of a feather key, projects into the inner shaft over a length of approximately two thirds of the inner shaft diameter, while the further or second (base-circle-side) connecting element, designed in the form of a feather key pin without a head, projects into the inner shaft over a length of approximately one third. Here, it is preferable for both the first and also the second connecting element to be pressed into the inner shaft (interference fit). In particular, the overlap of the interference fit of the second connecting element (radial pin) is configured here to be slightly smaller (smaller dimensional overlap) than the overlap of the interference fit(s) of the first connecting element (feather key pin). Since the first connecting element is pressed (with a relatively high pressing-in force) into the inner shaft before the movable cam is mounted and the pressing-in process of the second connecting element takes place with a reduced pressing-in force and to a reduced pressing-in depth in relation to the first pressing-in process, it is possible in this way to avoid a deformation of the inner shaft on account of the pressing-in process of the radial pin—with a loss of concentricity of the outer shaft. During the pressing-in process of the first connecting element, the inner shaft can be supported on the opposite side through the recess of the outer shaft.

In one possible embodiment of the invention, the first connecting element is a feather key, and the receptacle in the inner shaft is designed as a feather key receptacle.

In another possible embodiment of the invention, the first connecting element has a shank and a head part, wherein the shank is inserted into a receptacle in the inner shaft while the head part is inserted at least partially into a cutout situated on the joining diameter of the respective inner shaft cam. Here, said cutout is formed so as to be open at least toward one end side of the inner shaft cam, and the head part has at least two opposite side surfaces which bear with an interference fit against two corresponding inner surfaces of the cutout of the respective inner shaft cam. By means of the cutout which is formed so as to be open toward the end side of the inner shaft cam, the inner shaft cam can be pressed onto the head part of the connecting element parallel to the camshaft longitudinal axis. In this way, the two interference fits shank/inner shaft and head part/inner shaft cam do not influence one another, and the two interference fits can be formed securely and with adequate connection rigidity.

The connecting element may have a shank and a head part, the shank being inserted into the receptacle with an interference fit while the head part is at least a constituent part of the protruding part of the connecting element. In one exemplary embodiment of the invention, the head part of the connecting element is situated entirely outside the outer shaft. Alternatively, a head part may however also be situated only partially in the cutout in the respective inner shaft cam and partially in the recess in the outer shaft.

Furthermore, the head part may also be situated partially in the receptacle in the inner shaft, extend through the recess in the outer shaft and then project into the cutout in the inner shaft cam. In this case, the inner shaft may have, as a receptacle, a stepped bore into which the head part of the connecting element partially projects, while the lower region of the bore receives the shank of the connecting element. Said stepped bore is formed for example as a stepped cylindrical bore with two diameters. The larger diameter arranged at the outside receives a part of the head part of the connecting element. That section of the head part which is arranged in the widened part of the stepped bore is matched to the diameter of the widened region of the stepped bore, such that a cylindrical head part in said region has a larger cross section. In this way, the loading of the connecting element in said critical region is reduced, because as a result of the increase in cross section, the acting stress is reduced. Also, the contact pressure in the contact region between the inner shaft and head part is considerably reduced in the widened region of the stepped bore.

As an alternative to a stepped bore, it is also possible for a stepped recess to be provided as a receptacle. In contrast to a stepped bore with at least two cylindrical sections of different diameters, said stepped recess has a cylindrical section, in which the shank of the connecting element is arranged with an interference fit, and a non-cylindrical section which receives the non-cylindrical head part. As a result of the non-cylindrical shape, positionally accurate alignment of the head part relative to the longitudinal axis of the camshaft arrangement is advantageously made possible, such that the inner shaft cam can be assembled precisely in the correct intended axial position. At the same time, the shank of the connecting element may be cylindrical and inserted into the cylindrical section of the stepped recess in a simple manner. If the non-cylindrical section of the stepped recess is designed such that the cross section of said section is larger than that of the cylindrical section, then the advantages mentioned above in relation to the stepped bore with regard to a reduction in the stresses in the critical component region and a reduction of the contact pressure in the contact region between the inner shaft and head part are obtained in addition to the advantage of the exact alignment of the head part of the connecting element.

According to the invention, an inner shaft cam is connected to the inner shaft by means of two in particular diametrically opposite connecting elements, in such a way that a transmission of torque is ensured. Here, the shanks of two connecting elements may be inserted into a common receptacle (for example passage bore) in the inner shaft. In a particularly preferred embodiment of the invention, one connecting element is designed, as described above, as a so-called feather key pin (with shank and head part), and the further connecting element is designed as a so-called radial pin. The inner shaft cam which is already connected to the inner shaft for conjoint rotation therewith by means of the feather key pin can be fastened additionally by means of the radial pin. For this purpose, the radial pin is guided, on the base circle side (side region without cam elevation) of the inner shaft cam, through a radial passage opening into a receptacle of the inner shaft cam and is fixed in at least one of the two overlap regions (radial pin/inner shaft cam, radial pin/inner shaft)—preferably in both overlap regions—by means of an interference fit. Here, the resulting pressed-in lengths of the first and second connecting elements differ. The ratio of the pressed-in depth of the first connecting element to that of the second connecting element is advantageously approximately two to one (2:1).

The recess for the passage of the connecting element preferably extends through the outer shaft over a part of the circumference of the outer shaft, such that a movement of the connecting shaft and therefore of the inner shaft relative to the outer shaft by an adjustment angle α is possible.

The head part of a connecting element may be formed at right angles to the shank part of the connecting element. Furthermore, the two side surfaces of the head part and the two inner surfaces of the cutout may run in each case parallel to one another or conically with respect to one another in order to facilitate the pressing of the connecting part into the cutout or the pressing of the inner shaft cam onto the head part and to generate an interference fit. The two side surfaces of the head part and/or the two inner surfaces of the cutout in the inner shaft cam may also have a profiled surface. It is advantageous for the head part of the first connecting element to be formed with insertion bevels. Improved axial assembly of the cam is obtained in this way. Here, during the assembly process of the cam, the already preassembled (or already pressed-in) connecting element (feather key) should be supported counter to the assembly direction.

The cutout in the inner shaft cam may, in both embodiments of one or the first connecting element (feather key and feather key pin), be designed as a groove which extends over the entire width of the inner shaft cam. Here, said cutout is situated preferably centrally below the elevation of the inner shaft cam, and the connecting element is formed preferably as a single-piece component.

An advantage of the first embodiment in which a feather key is used as a first connecting element is that feather keys are cheap mass-produced parts which are readily available. The feather key connecting technique is well mastered in terms of production technology. Furthermore, the entire width of the cam, that is to say the cam thickness in the axial direction, of the inner shaft cam may be utilized to form the interference fit between the feather key and inner shaft cam, as a result of which a particularly large joining surface is provided to form the interference-fit connection between the inner shaft cam and connecting element. This yields a particularly secure connection, as a result of which in turn the radial structural height of the inner shaft cam can be minimized, which permits a saving of installation space and weight. Said embodiment of the camshaft arrangement according to the invention with a feather key can therefore be used particularly advantageously for small passenger motor vehicle camshafts.

A further advantage of the camshaft arrangement according to the invention is that, for the required interference fit of the connection between the connecting element and inner shaft and between the connecting element and inner shaft cam, the cross section of the connecting element need not be joined over the entire connecting element. In fact, an interference fit for the connection between the connecting element and inner shaft is realized by means of the cross section of the shank, and separately therefrom, an interference fit for the connection between the connecting element and inner shaft cam is realized by means of the side surfaces of the head part. This leads to increased security of the respective interference fits.

Furthermore, an inner shaft cam can be connected to the inner shaft in a simple manner by virtue of firstly one or the first connecting element being inserted into the inner shaft, the inner shaft cam thereupon being pushed axially onto the head part of the connecting element, and finally the further or second connecting element designed as a radial pin being pressed through the passage opening of the inner shaft cam element into the receptacle of the inner shaft, said second connecting element advantageously forming an interference fit both with the inner shaft and also with the inner shaft cam element.

Further advantages, special features and expedient refinements of the invention will emerge from the subclaims and from the following illustration of preferred exemplary embodiments on the basis of the figures, in which:

Figure 1:
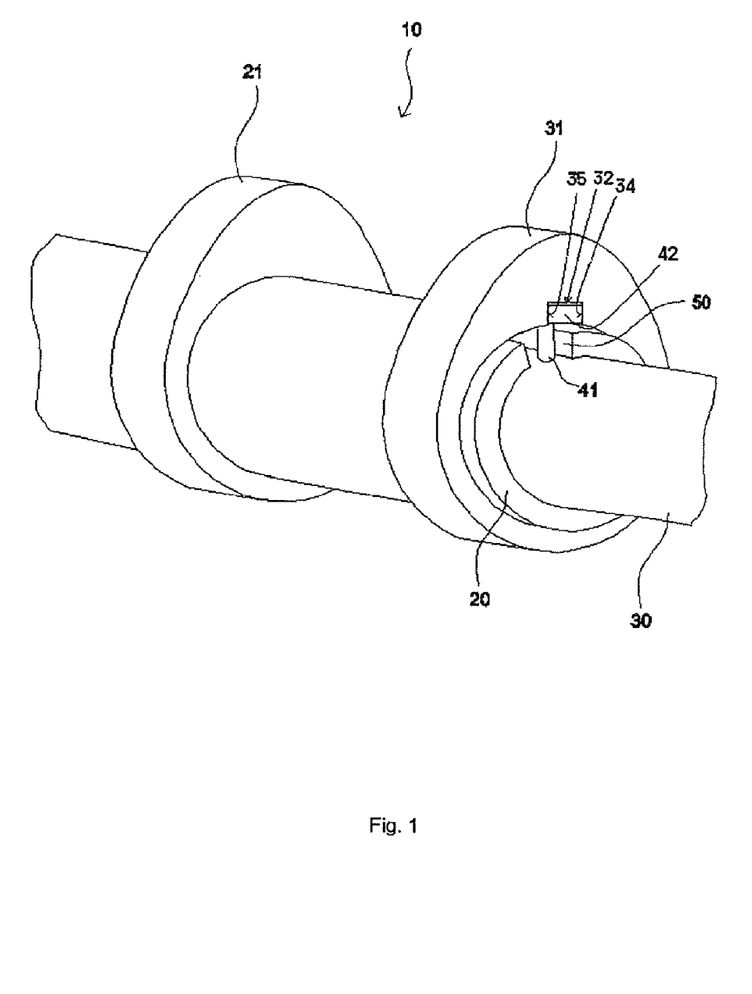
FIG. 1 shows an exemplary embodiment of the camshaft arrangement according to the invention in a perspective view.

FIG. 1 schematically illustrates an exemplary embodiment of a generic camshaft arrangement 10 in which an inner shaft 30 is arranged coaxially in an outer shaft 20, wherein the illustration of the shaft bodies is truncated. The two shafts may be mounted so as to be rotatable relative to one another by means of bearings (likewise not illustrated). The adjustment of the two shafts relative to one another by an angle of rotation a may take place for example by means of an adjustment device (likewise not illustrated) in the form of a phase adjuster. The inner shaft may be designed as a solid shaft or hollow shaft, wherein in the exemplary embodiment of the figures, a solid shaft has been selected.

A plurality of outer shaft cams 21 are attached to the outer surface of the outer shaft 20 for conjoint rotation therewith. The attachment of said outer shaft cam elements may take place in a known way for example by shrink-fitting, with an interference fit being generated. For this purpose, the joining diameter of the cam is selected such that, at ambient temperature, it is smaller by a certain "overlap" than the outer diameter of the outer shaft. If the cam element is heated, the inner diameter expands and the cam element can be threaded onto the outer shaft and positioned. Here, it may also be provided that the surface of the outer shaft is previously machined or treated in the region of the cam. A profiling may for example be provided. Furthermore, the outer shaft may additionally be cooled in order thereby to attain a reduction in the diameter of the outer shaft. Intermediate elements such as bushes may also be provided between the outer shaft and the respective cam element if appropriate. When the cam element cools, the cam shrinks onto the shaft, wherein the overlap prevents a movement of the cam on the outer shaft.

As an alternative to such shrink-fitting of the cam elements, however, any suitable methods may be used for attaching the cams 21 to the outer shaft 20 for conjoint rotation therewith. For example, the outer shaft cams may be welded to the outer shaft, or a plurality of beads or webs are produced by material displacement by rolling machining tools in the regions in which the cams are to be attached. The cams are provided for example with a beveled inner recess and are pushed with said recess over the beads. In so doing, said beads are deformed in the outer region and thereby squeezed into the recess, as a result of which the cam is held on the outer shaft in a positively locking and non-positively locking fashion.

The outer shaft 20 also supports a plurality of inner shaft cams 31 which are rotatably mounted on the outer shaft but connected to the inner shaft 30 for conjoint rotation therewith. A small amount of (bearing) play is thereby provided between the inner diameter of the inner shaft cam elements 31 and the outer diameter of the outer shaft 20 in order to permit a rotation of the inner shaft cams 31 about the longitudinal axis of the camshaft arrangement.

Figure 2:
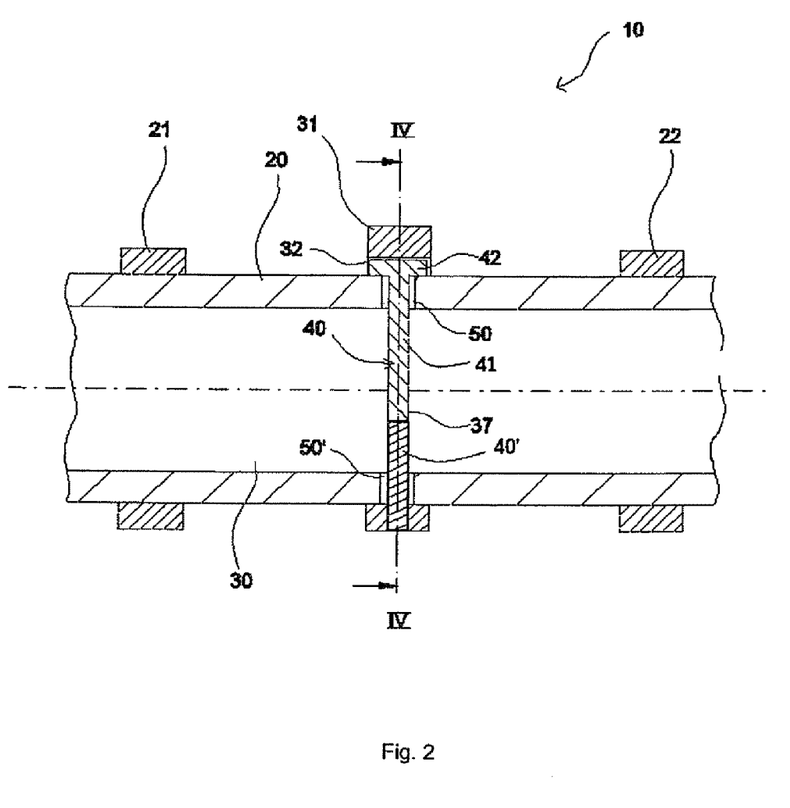
FIG. 2 shows an exemplary embodiment of the camshaft arrangement according to the invention as per FIG. 1 in longitudinal section.

According to the invention, the inner shaft cams 31 are connected to the inner shaft 30 by means of at least two pin-like connecting elements 40, 40' as schematically illustrated in FIG. 1 and FIG. 2. One or the first connecting element 40 is advantageously designed as a feather key pin with a shank 41 and a head part 42, while the second connecting element 40' is designed as a so-called headless radial pin.

The shank 41 of the first connecting element 40 is inserted with an interference fit into a bore in the inner shaft 30, while the head part 42 is inserted with an interference fit into a groove 32 in the inner shaft cam element 31. A corresponding dimensional overlap is provided between the bore and the shank 41, and between the groove 32 and the head part 42, in order to ensure an interference fit. The shape of the head part 42 is matched to the shape of the groove 32 or vice versa. The two interference fits are independent of one another.

The connecting element consisting of shank 41 and head part 42 is preferably formed in one piece. A shank part and a head part 42 may however also be joined together to form a two-piece connecting element. Said connection may take place for example by means of a screw connection or pin connection. The shank 41 may have a circular, rectangular or some other geometric shank cross section which is adapted to the cross section of the associated receptacle in the inner shaft 30. Here, a round shank cross section has the advantage for example that the shank 41 and the associated bore 37 in the inner shaft 30 can be produced more easily than other shank cross sections. Since the position of the head part 42 must be aligned in relation to the groove 32 in the inner shaft cam 31, however, rectangular or otherwise shaped shank cross sections have the advantage that a defined alignment of the head part 42 of a connecting element can take place already as the shank is inserted into the inner shaft 30.

The head part 42 is preferably formed at right angles to the shank 41 and may for example be cuboidal. The connecting element 40 is therefore preferably enlarged in the upward direction by the head part. It may however also be provided that the head part is smaller than the shank and is attached, for example as a cuboid, to the upper surface of a pin. In any case, the head part 42 here always has at least two side surfaces and 44 which run parallel to or conically with respect to one another. Said side surfaces 43 and 44 of the head part 42 may have a profiling. The side surfaces 43 and 44 of the head part 42 of the connecting element 40 bear with an interference fit against the inner surfaces 34 and 35 of the groove 32 in order thereby to produce a fixed connection.

In the exemplary embodiment of the invention illustrated in the figures, in which the first connecting element 40 has a shank and a head part, the shank 41 has a round cross section while the head part 42, which is formed at right angles to said pin, is cuboidal and is seated on the end of the shank. The shank 41 of the connecting element 40 is, in the assembled state of the assembled camshaft arrangement 10, inserted into a preferably radial receptacle 37 in the inner shaft 30. Said receptacle 37 is for example a round bore (blind hole or passage bore) which is formed radially into the material of the inner shaft 30. The round shank 41 of the connecting element 40 is inserted preferably with an interference fit into said bore 37.

In the outer shaft 20 there is provided for each of the two connecting elements 40, 40' a recess 50, 50' in order to allow the respective connecting element 40, 40' to extend from the inner shaft 30 to the inner shaft cam element 31. Each connecting element 40, 40' is guided through an associated recess 50, 50', wherein in the case of the first connecting element 40, the head part 42 is inserted into a cutout 32 on the joining diameter of the inner shaft cam 31, and the second connecting element 40' is arranged in regions in the passage opening 33 of the inner shaft cam element 31. The cutout 32 is preferably a groove which runs in the direction of the axis of the camshaft arrangement 10 and which is formed so as to be open at least toward one end surface of the inner shaft cam 31. In the exemplary embodiment illustrated in the figures, a groove 32 is provided which is simpler to produce and which has two inner surfaces 34 and 35 running parallel or conically. Said inner surfaces may, like the side surfaces of the head part 42 of the connecting element 40, be provided with a profiling.

It emerges from the exemplary embodiments that the groove 32 is situated preferably centrally below the elevation 36 of the cam 31 and the passage opening 33 is situated diametrically opposite in the base circle of the inner shaft cam element 31. Both the groove 32 and also the passage opening 33 may however also be arranged offset with respect to the positions described above if the material thickness of the cam permits this.

For the assembly of the inner shaft cams 31, the shank 41 of the first connecting element 40 (feather key pin) is inserted with an interference fit into the associated receptacle 37, formed for example as a bore, in the inner shaft 30. The associated head part 42 is aligned in the direction of the camshaft axis such that an inner shaft cam 31 can be threaded onto the outer shaft 20 and pushed with its groove 32 from the side onto the head part 42 protruding beyond the outer shaft 20 and inserted with an interference fit into the groove 32. The mechanical joining process by means of the conventional joining process such as shrink-fitting may be supplemented. If the side surfaces 43 and 44 of the head part 42 and the inner surfaces 34 and 35 of the groove 32 run conically with respect to one another, the inner shaft cam 31 is pushed over the head part such that the shape of the head part 40 is congruent with the shape of the groove 32. The already (pre-)fixed inner shaft cam 31 is subsequently further fixed by virtue of the pin-shaped second connecting element 40' (radial pin) being pressed through the bore or passage opening 33 into the receptacle 37, 37' of the inner shaft 30, wherein the dimensional overlap for the interference fit of the radial pin in the inner shaft 30 may be dimensioned to be smaller than the dimensional overlap for the interference fit of the feather key pin with the inner shaft 30.

Figure 3:
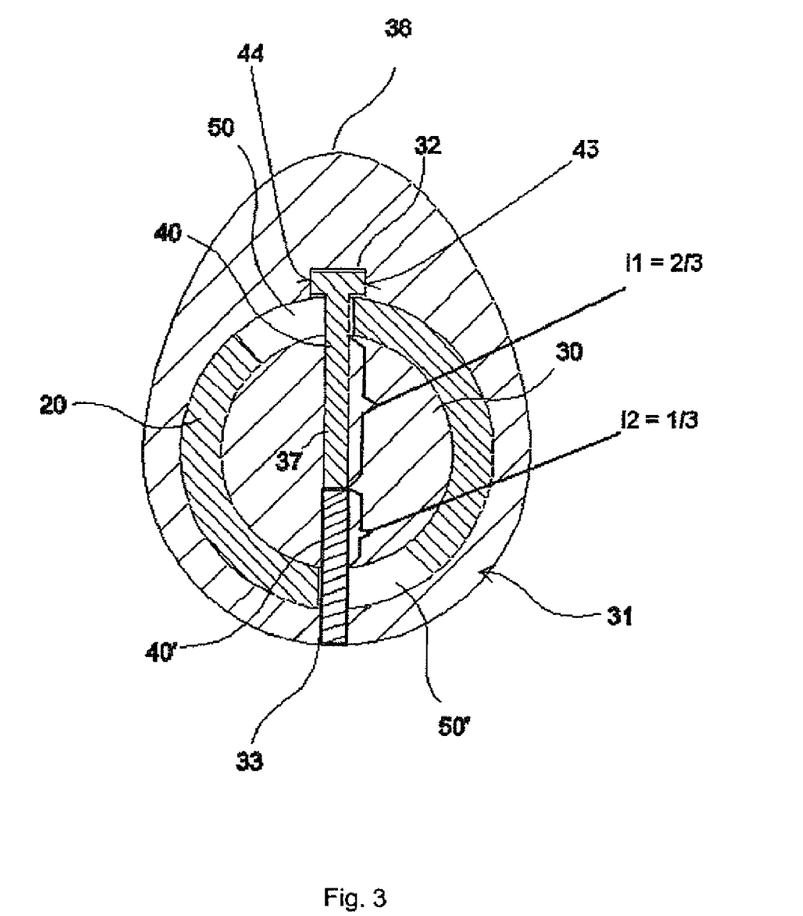
FIG. 3 shows a cross section through an exemplary embodiment of the camshaft arrangement according to the invention as per FIG. 1.

FIG. 3 shows the arrangement according to the invention as per FIG. 1 once again in cross section. As already shown in FIG. 2, the overlap regions of the two connecting elements 40, 40' with the inner shaft 30 (or the respective length over which the respective connecting element 40, 40' is inserted into the inner shaft 30) are preferably of different size, wherein the overlap region of the cam-side connecting element 40 is significantly larger than the overlap region of the further connecting element 40'. The ratio of the overlaps is advantageously substantially two to one (2:1).

Figure 4:
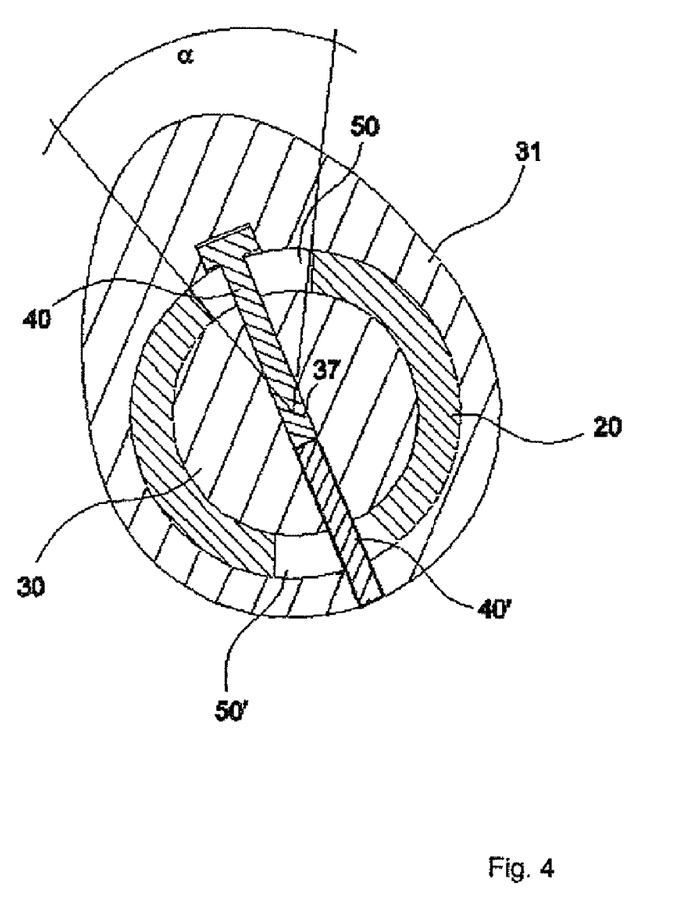
FIG. 4 shows a cross section through an exemplary embodiment of the camshaft arrangement according to the invention, in which a rotation of the inner shaft relative to the outer shaft has taken place.

FIG. 4 illustrates a camshaft arrangement in which the inner shaft 30 has been rotated relative to the outer shaft 20. The associated inner shaft cam 31 is driven by the connecting elements 40 and 40' so as to rotate about the outer shaft 20 on which it is mounted with play. There is therefore a defined degree of play between the underside of the head part 42 of the connecting element 40 and the outer surface of the outer shaft. The underside of the head part 42 may be matched to the outer contour of the outer shaft 20 and may for example be of slightly concavely curved design.

Figure 5:
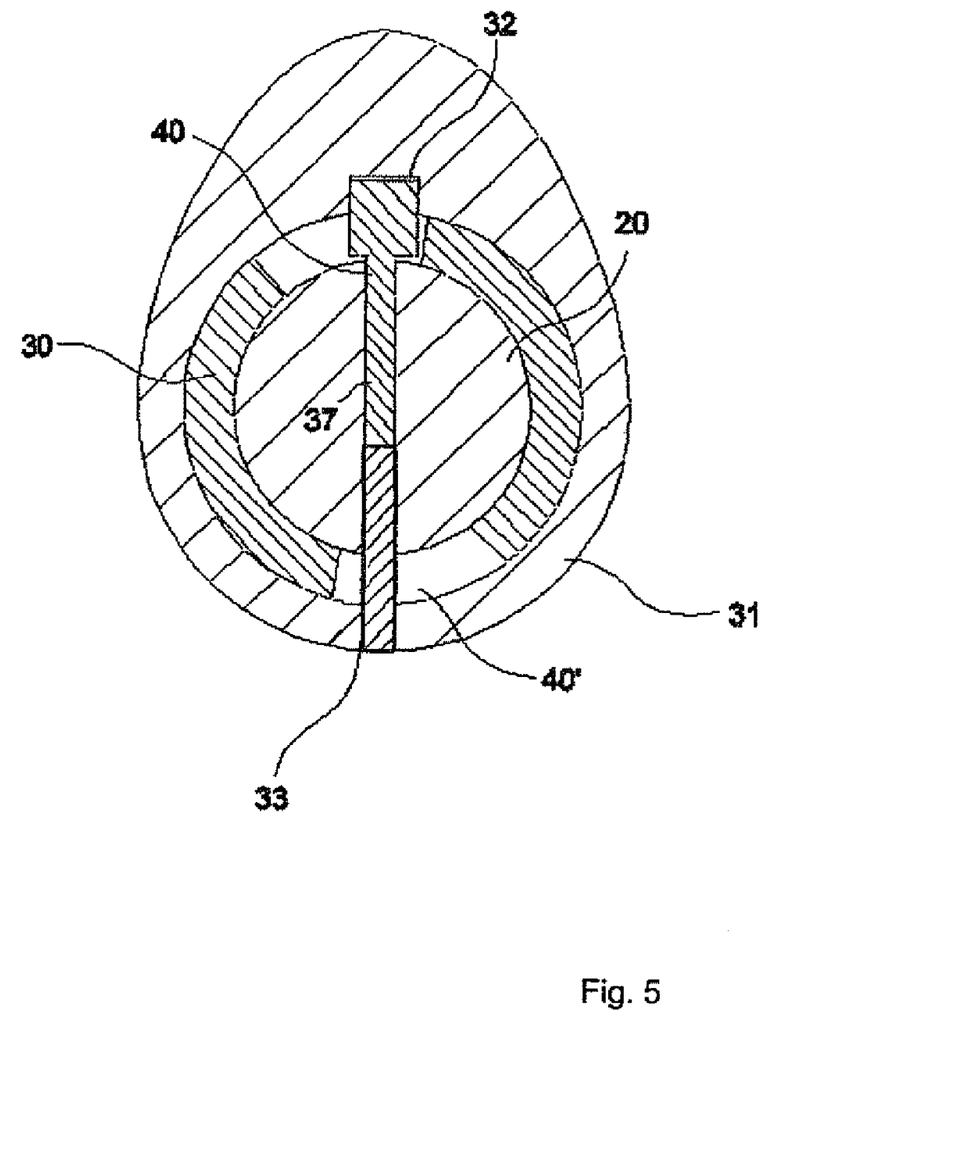
FIG. 5 shows a cross section through an exemplary embodiment of the camshaft arrangement according to the invention having a region of the head part of the connecting element within the recess in the outer shaft.

In a further possible exemplary embodiment which is illustrated by way of example in FIG. 5, the head part 42 of the connecting element 40 is not situated entirely outside the outer shaft but rather is arranged partially in the recess 50 within the outer shaft. Said embodiment has the advantage for example that a defined degree of play need not be provided between the underside of the head part and the outer surface of the outer shaft. The connecting element 40 need merely be inserted into the inner shaft 30 to such an extent that the groove 32 of an inner shaft cam element 31 can be pushed over that region of the head part 42 which protrudes from the outer shaft 20. The bore 37 illustrated in FIG. 5 may also be designed as a stepped bore, and the head part may project partially into the stepped bore. Said embodiment is however not illustrated in FIG. 5.

As an alternative to the embodiments of the invention illustrated in the figures, a connecting element 40, 40' may also be formed by a connecting pin with a square cross section, the cross sectional shape of which does not vary over the length. Here, the pin has a lower shank region which is inserted into a recess in the outer shaft 30. The dimensions of the upper head region are selected such that the groove 32 of an inner shaft cam 31 can be pushed from the side over the head region. An interference fit is likewise generated between two opposite inner surfaces of the groove and the corresponding side surfaces of the head region of the connecting pin, which may be ensured by means of a suitable dimensional overlap between the groove of the inner shaft cam and the head region. In said embodiment, the side surfaces of the connecting element may be provided, in the head region, with a profiling in order to improve the interference fit with the inner shaft cam element 31.

The formation of the first connecting element from a shank and a head part formed at right angles thereto may however be more advantageous because the shape and the dimensions of the shank may be selected such that it can be inserted in a simple manner into a recess in the inner shaft, while the shape and the dimensions of the head part can be adapted to the requirements for being received in the groove of an inner shaft cam. Therefore, a different shape may be advantageous for the shank than is advantageous for the head part of a connecting element.

Figure 6:
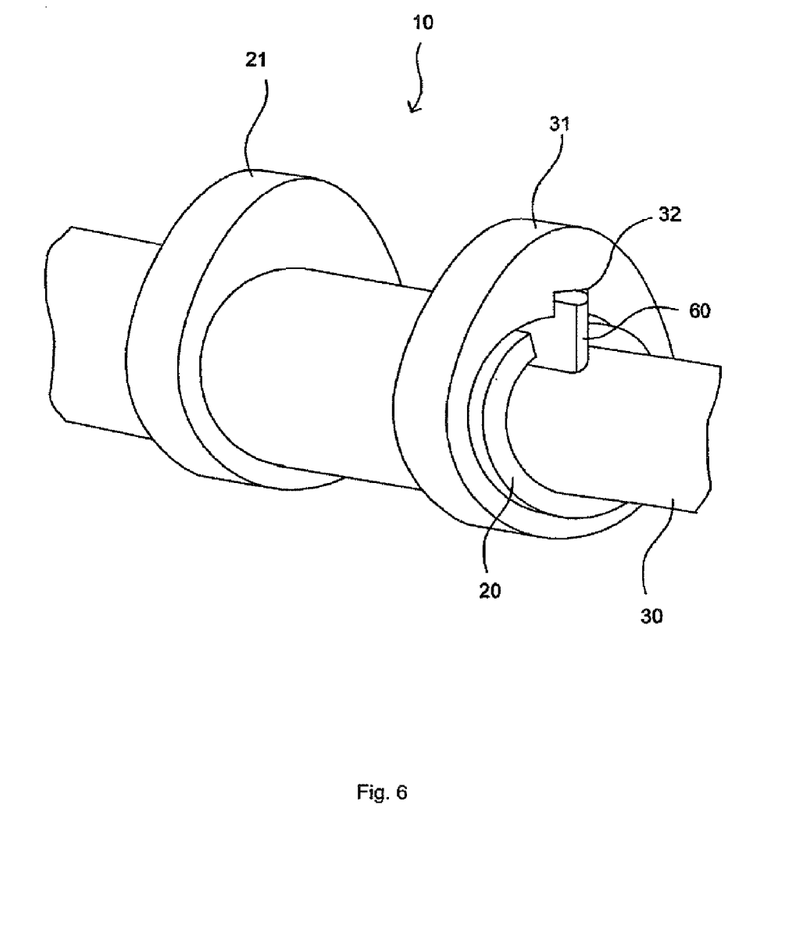
FIG. 6 shows an exemplary embodiment of the camshaft arrangement according to the invention with a feather key.
Figure 7:
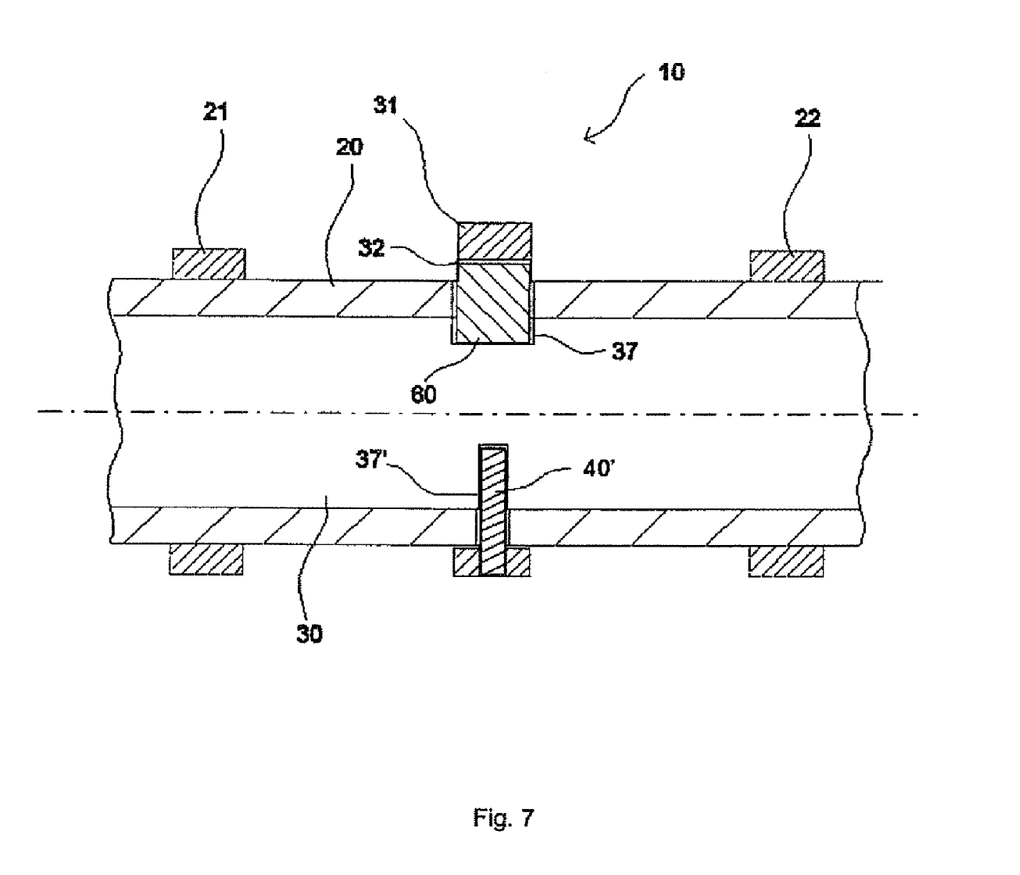
FIG. 7 shows a cross section through an exemplary embodiment of the camshaft arrangement according to the invention with a feather key.

A further exemplary embodiment of the invention is illustrated in FIGS. 6 and 7, in which the cam-side connecting element 40 is designed as a feather key 60 which is inserted into a feather key groove in the inner shaft 30. The side surfaces of the feather key 60 bear, likewise with an interference fit, against the side inner surfaces of the groove 32 in the inner shaft cam 31. Here, the feather key 60 extends at least over the entire length of the groove 32. The side surfaces of the feather key may run parallel or conically with respect to one another. Furthermore, said side surfaces of the feather key 60 may be of profiled design. Here, too, the second connecting element 40' is designed as a pressed-in radial pin.

LIST OF REFERENCE SYMBOLS

10 Camshaft arrangement, camshaft system
20 Outer shaft
21, 22 Outer shaft cam, outer shaft cam element
30 Inner shaft
31 Inner shaft cam, inner shaft cam element
32 Cutout, groove in inner shaft cam element
33 Passage opening in inner shaft cam element
34, 35 Inner surface, groove
36 Cam elevation
37, 37' Receptacle, bore in inner shaft, feather key
40 groove
40, 40' Connecting element
41, 41' Shank, shank region
42, 42' Head part, head region
43, 44 Side surfaces of a head part, head region
50, 50' Recess in outer shaft
60, 61 Feather key
α Circumferential angle, adjustment angle

The invention claimed is:

1. A camshaft arrangement for a motor vehicle engine, comprising:
   two shafts arranged coaxially one inside the other, in which a hollow outer shaft and an inner shaft are arranged so as to be rotatable relative to one another;
   an outer shaft cam attached to the outer shaft for conjoint rotation therewith; and
   an inner shaft cam having an inside diameter surface and rotatably supported by the outer shaft and attached to the inner shaft for conjoint rotation therewith by first and second connecting elements, which protrude with play through recesses in the outer shaft to allow limited relative rotation between the inner and outer shafts, wherein:
   the first connecting element being inserted into a receptacle in the inner shaft in such a way that a protruding part of the connecting element protrudes out of the receptacle, and that the protruding part is inserted at least partially into a cutout formed on the inside diameter surface of the inner shaft cam and without extending to a radial outer surface of the inner shaft cam, said cutout extending axially from one end side of the inner shaft cam and at least partially through the inner shaft cam, and that the protruding part has at least two circumferentially spaced opposite side surfaces which bear with an interference fit against two corresponding inner surfaces of the cutout of the inner shaft cam to radially affix the inner shaft cam to the inner shaft;
   the second connecting element being designed in the form of a radial member which is disposed in a passage opening extending through the inner shaft cam and also in a second receptacle of the inner shaft and which is held with an interference fit in one of the passage opening and the receptacle to axially affix the inner shaft cam to the inner shaft; and
   the recesses in the outer shaft have a circumferential width greater than a width of the connecting element, enabling movement of the inner shaft relative to the outer shaft by an adjustment angle.

2. The camshaft arrangement as claimed in claim 1, wherein the second connecting element is arranged diametrically opposite the first connecting element.

3. The camshaft arrangement as claimed in claim 1, wherein the inner shaft has a common receptacle for first and second connecting elements.

4. The camshaft arrangement as claimed in claim 3, wherein the common receptacle is designed as a passage bore of the inner shaft.

5. The camshaft arrangement as claimed in claim 4, wherein the first connecting element overlaps the common receptacle to a greater extent than the second connecting element.

6. The camshaft arrangement as claimed in claim 3, wherein the first connecting element is arranged in the common receptacle over a greater pressed-in length than the second connecting element, and in particular the ratio of the different pressed-in lengths is approximately two to one.

7. The camshaft arrangement as claimed in claim 1, wherein the passage opening is formed as a bore.

8. The camshaft arrangement as claimed in claim 1, wherein one connecting element has a shank and a head part, the shank being inserted into a receptacle in the inner shaft while the head part is inserted at least partially into a cutout situated on the inside diameter surface of the inner shaft cam, said cutout being formed so as to be open at least toward one end side of the inner shaft cam, and in that the head part has at least two opposite side surfaces which bear with an interference fit against two corresponding inner surfaces of the cutout of the respective inner shaft cam.

9. The camshaft arrangement as claimed in claim 1, wherein one connecting element has a shank and a head part, the shank being inserted with an interference fit into the receptacle and the head part being a constituent part of the protruding part of the connecting element.

10. A camshaft arrangement for a motor vehicle engine, comprising:
- two shafts arranged coaxially one inside the other, in which a hollow outer shaft and an inner shaft are arranged so as to be rotatable relative to one another;
- an outer shaft cam attached to the outer shaft for conjoint rotation therewith while an inner shaft cam is rotatably supported by the outer shaft and attached to the inner shaft for conjoint rotation therewith by a first and a second connecting element, which protrude with play through recesses in the outer shaft to allow limited relative rotation between the inner and outer shafts, wherein:
- the first connecting element having a shank and a head part, the shank being inserted into a receptacle in the inner shaft and the head part being inserted at least partially into a cutout situated on the joining diameter of the respective inner shaft cam, said cutout being formed so as to be open at least toward one end side of the inner shaft cam, and in that the head part has at least two opposite side surfaces which bear with an interference fit against two corresponding inner surfaces of the cutout of the respective inner shaft cam;
- the second connecting element being designed in the form of a radial member which is arranged at least in regions both in a passage opening of the inner shaft cam and also in the receptacle of the inner shaft and which is held with an interference fit in one of the passage opening and the receptacle; and
- the head part of the connecting element is situated entirely outside the outer shaft.

11. The camshaft arrangement as claimed in claim 8 wherein the head part is situated partially in the cutout in the respective inner shaft cam and partially in the recess in the outer shaft.

12. The camshaft arrangement as claimed in claim 11, wherein the inner shaft has a stepped bore, the head part projecting partially into the stepped bore.

13. The camshaft arrangement as claimed in claim 8 wherein the head part is formed at right angles to the shank of the connecting element.

14. The camshaft arrangement as claimed in claim 8 wherein the two side surfaces of the head part and the two inner surfaces of the cutout run in each case parallel to one another or conically with respect to one another.

15. The camshaft arrangement as claimed in claim 8 wherein the two side surfaces of the head part and/or the two inner surfaces of the cutout in the inner shaft cam have a profiled surface.

16. The camshaft arrangement as claimed in claim 8 wherein the cutout is formed as a groove which extends over the entire width of the inner shaft cam.

17. The camshaft arrangement as claimed claim 8 wherein the cutout is situated radially centrally below the elevation of the inner shaft cam.

18. A camshaft arrangement for a motor vehicle engine, comprising:
- two shafts arranged coaxially one inside the other, in which a hollow outer shaft and an inner shaft are arranged so as to be rotatable relative to one another;
- an outer shaft cam attached to the outer shaft for conjoint rotation therewith while an inner shaft cam is rotatably supported by the outer shaft and attached to the inner shaft for conjoint rotation therewith by a first and a second connecting element, which protrude with play through recesses in the outer shaft to allow limited relative rotation between the inner and outer shafts, wherein:
- the first connecting element being inserted into a receptacle in the inner shaft in such a way that a protruding part of the connecting element protrudes out of the receptacle, and that the protruding part is inserted at least partially into a cutout situated on the joining diameter of the respective inner shaft cam, said cutout being formed so as to be open at least toward one end side of the inner shaft cam, and that the protruding part has at least two opposite side surfaces which bear with an interference fit against two corresponding inner surfaces of the cutout of the respective inner shaft cam;
- the second connecting element being designed in the form of a radial pin which is arranged at least in regions both in a passage opening of the inner shaft cam and also in the receptacle of the inner shaft and which is held with an interference fit in one of the passage opening and the receptacle; and
- the first connecting element is a feather key and the receptacle is designed as a feather key receptacle.

* * * * *